United States Patent
Werquin et al.

(10) Patent No.: US 11,181,073 B2
(45) Date of Patent: Nov. 23, 2021

(54) ACTUATOR EQUIPPED WITH A NO BACK SYSTEM WITH INHIBITION ZONE

(71) Applicant: SAFRAN ELECTRONICS & DEFENSE, Boulogne Billancourt (FR)

(72) Inventors: Mickael Werquin, Boulogne Billancourt (FR); Julien Hautecoeur, Boulogne Billancourt (FR); Christophe Bastide, Boulogne Billancourt (FR); Pascal Omnes, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 35 days.

(21) Appl. No.: 16/490,859

(22) PCT Filed: Feb. 23, 2018

(86) PCT No.: PCT/EP2018/054575
§ 371 (c)(1),
(2) Date: Sep. 3, 2019

(87) PCT Pub. No.: WO2018/162260
PCT Pub. Date: Sep. 13, 2018

(65) Prior Publication Data
US 2020/0032741 A1    Jan. 30, 2020

(30) Foreign Application Priority Data

Mar. 6, 2017    (FR) ...................................... 17 51773

(51) Int. Cl.
*F02K 1/76* (2006.01)
*F16H 25/24* (2006.01)
(Continued)

(52) U.S. Cl.
CPC ............. *F02K 1/763* (2013.01); *F16H 25/20* (2013.01); *F16H 25/2015* (2013.01); *F16H 25/2454* (2013.01); *F16H 2035/005* (2013.01)

(58) Field of Classification Search
CPC ...... F02K 1/766; F02K 1/763; F16H 25/2015; F16H 25/2454; F16H 2025/005;
(Continued)

(56) References Cited

U.S. PATENT DOCUMENTS

| | | | | |
|---|---|---|---|---|
| 4,747,319 A | * | 5/1988 | Sakuta .................. | B62D 33/07 74/411.5 |
| 4,850,458 A | * | 7/1989 | Allan ...................... | F16D 59/00 188/134 |
| 6,109,415 A | * | 8/2000 | Morgan .................. | B64C 13/28 192/223.1 |

(Continued)

FOREIGN PATENT DOCUMENTS

| | | |
|---|---|---|
| EP | 0960811 A2 | 12/1999 |
| EP | 3078589 A1 | 10/2016 |
| WO | WO-2015040170 A2 * 3/2015 | ......... F16H 25/2454 |

*Primary Examiner* — Jake Cook
*Assistant Examiner* — Gregory Robert Weber
(74) *Attorney, Agent, or Firm* — Muncy, Geissler, Olds and Lowe, P.C.

(57) ABSTRACT

An actuator includes a screw mounted on a body to pivot, a nut connected to an element for moving, and that is engaged on the screw to be moved between an over-retracted first position and a deployed second position on either side of a retracted third position that is spaced apart from the over-retracted position by a distance corresponding to the screw rotating through a first angular sector and an anti-extension device comprising a friction disk having at least one smooth surface and an obstacle both for co-operating with at least one pawl, thereby defining both at least one second angular sector of free rotation for the friction disk and also a position for blocking the friction disk.

8 Claims, 9 Drawing Sheets

(51) Int. Cl.
 *F16H 25/20* (2006.01)
 *F16H 35/00* (2006.01)

(58) Field of Classification Search
 CPC . F16H 2025/2463; B64D 29/00; B64D 29/02; B64D 29/04; B64D 29/06; B64D 29/08; F16D 41/12; F16D 41/125; F16D 41/30
 See application file for complete search history.

(56) References Cited

U.S. PATENT DOCUMENTS

| | | | | |
|---|---|---|---|---|
| 6,494,033 | B1 * | 12/2002 | Davies | F02K 1/76 188/162 |
| 8,146,858 | B2 * | 4/2012 | Port-Robach | F16D 41/12 244/99.9 |
| 9,021,813 | B2 * | 5/2015 | Jasklowski | F02K 1/805 60/771 |
| 9,677,502 | B2 * | 6/2017 | Caruel | B64D 29/08 |
| 9,709,003 | B2 * | 7/2017 | Maerky | F16H 25/2204 |
| 9,908,630 | B2 * | 3/2018 | Guigon | B64D 29/08 |
| 10,054,079 | B2 * | 8/2018 | Kopecek | B64D 29/06 |
| 10,406,729 | B2 * | 9/2019 | Gaw | B29C 33/302 |
| 10,422,301 | B2 * | 9/2019 | Karnofski | F02K 1/70 |
| 10,520,070 | B2 * | 12/2019 | Turpin | B64C 13/28 |
| 10,780,810 | B2 * | 9/2020 | Carl | F16D 49/04 |
| 2004/0040813 | A1 * | 3/2004 | Darby | F16D 41/02 192/46 |
| 2015/0259874 | A1 * | 9/2015 | Cunningham | E02F 3/3618 403/52 |
| 2016/0369877 | A1 * | 12/2016 | Gitnes | F16H 25/2454 |
| 2017/0292474 | A1 * | 10/2017 | Davies | F02K 1/72 |
| 2018/0058372 | A1 * | 3/2018 | Christensen | F02K 1/625 |

* cited by examiner

ACTUATOR EQUIPPED WITH A NO BACK SYSTEM WITH INHIBITION ZONE

FIELD OF THE INVENTION

The present invention relates to the field of aviation actuators, and more particularly thrust reverser actuators for jets, and more particularly for turbojets.

BACKGROUND OF THE INVENTION

In a conventional thrust reverser system for a turbojet of an aircraft, the nacelle of the turbojet is provided with movable surfaces that can be moved between an over-retracted first position and a deployed second position so as to send a portion of the gas stream produced by the turbojet back towards the front, these positions being situated on either side of a retracted third position for the movable surface. Activating the thrust reverser serves in particular to reduce the distance required by the aircraft for landing. From the start of opening the movable surfaces, deploying them subjects a movable surface to large forces that tend to cause it to move quickly from its retracted position to its deployed position.

Conventionally, the movable surfaces are moved by means of hydraulic actuators, which have the particular advantage of braking the load to which they are subjected.

Proposals have been made to equip thrust reversers with electrical actuators that replace hydraulic actuators. Such an electrical actuator comprises a body and an electric motor for driving a ball screw in rotation. The ball screw comprises a screw mounted on the body to pivot and a nut engaged on the screw. The nut is provided with connection means connecting it to the movable surface and it can move from a retracted first position in which the movable surface is closed to a deployed second position in which the movable surface deflects at least a portion of the stream from the jet.

In a ball screw, there is very little friction between the nut and the screw so that it constitutes a movement transmission system that is reversible: rotating the screw causes the nut to move axially, however an axial force on the nut can cause the screw to rotate and the nut to move axially in the direction of the axial force. Unfortunately, it is essential to prevent the movable surface from being capable of deploying under the effect of forces that might be exerted on it directly: specifically, an accidental deployment of the movable surface could have consequences for the safety of the airplane that are catastrophic. In general manner, it is desirable for the deployment of the movable surface to be under control and in particular for its deployment speed to be under control. For this purpose, the actuator may include an anti-extension device (also known as a no-back device) that brakes rotation of the screw when the movable surface exerts a traction force on the nut tending to move it towards its retracted second position. Such a device is known from EP 3 078 589. Such a situation occurs in particular when opening the movable surface during a stage of landing. The relative wind to which the turbojet is subjected, which can add to the forces from the turbojet stream on the movable surface, then exerts a large traction force on the movable surface as from the beginning from it being opened.

The anti-extension device is arranged to avoid braking rotation of the screw while the nut is moving from its deployed second position towards its retracted third position in order to avoid any need to overdimension the electric motor.

To oppose accidental deployment of the movable surface, provision is also made for a main locking device (or primary lock system (PLS)) comprising locks mounted on the nacelle to retain the movable surface in its retracted position. Generally, the movable surface actuators adopt their "over-retracted" first position after following a retraction over-travel from their retracted third position. When the nut is in its over-retracted first position in which it holds the movable surface beyond its retracted position, the movable system lightly compresses gaskets of the nacelle that co-operate with the movable surface, thereby enabling the locks of the main locking device to be disengaged so as to allow the movable surface subsequently to be deployed.

The movable surface is designed on the assumption that in flight it is locked in its retracted position by the main locking device. The vibration to which the movable surface is subjected in flight can lead to forces of short duration tending to bring the movable surface towards its over-retracted position. Since the ball screw is reversible, such movement is possible. When those forces disappear, it is important for the movable surface to be free to return to its retracted third position for which the nacelle is designed. Specifically, if it fails to return to its retracted position, the nacelle would be subjected to large forces resulting from the combination of the internal force holding the movable surface in the over-retracted position plus the vibration and coming from its connection with its actuator instead of the primary lock. Since the most favorable design for the doors and the nacelle is obtained with forces passing through the main locks and not via the actuators, it is appropriate for the actuator to leave the nacelle free to return from its over-retracted first position towards its retracted third position.

On the nut passing from its over-retracted third position to its retracted first position, the anti-extension device brakes the rotation of the screw and prevents the screw from reaching its retracted third position. This makes it necessary to install a mechanism for disengaging the anti-extension device, thereby representing a safety risk and also requiring additional control instrumentation.

Those solutions increase the weight and the size of the equipment, which puts a brake on the use of electrical actuators for thrust reversal.

OBJECT OF THE INVENTION

An object of the invention is to reduce the weight and the size of an electrical thrust reversal actuator.

SUMMARY OF THE INVENTION

To this end, there is provided an actuator comprising a body, a screw rotatably mounted on the body to pivot, a nut that is provided with connection means for connecting it to an element for moving, and that is engaged on the screw to be moved by the screw rotating between an over-retracted first position and a deployed second position on either side of a retracted third position that is spaced apart from the over-retracted position by a distance corresponding to the screw rotating through a first angular sector. The actuator also comprises an anti-extension device comprising a friction disk free to rotate relative to the screw and designed to use friction to brake a portion constrained to rotate with the screw when the element for moving exerts a traction force on the nut tending to move the nut towards the deployed second position. According to the invention, the friction disk has at least one smooth surface and an obstacle arranged in the smooth surface both for co-operating with at least one pawl connected to the body, thereby defining both at least one second angular sector of free rotation for the friction disk in a predetermined direction and also a position for blocking the friction disk in this predetermined direction. The smooth surface has a length such that the amplitude of the first angular sector is strictly less than the amplitude of the second angular sector.

In the meaning of the present application, a surface of the friction disk is said to be "smooth" when it does not have any obstacle suitable for interacting with the pawl in order to block rotation of the friction disk.

When the nut passes from its over-retracted first position to its retracted third position, the pawl co-operates with the smooth surface and the anti-extension mechanism is inactive (it does not oppose rotation of the screw in this direction). The movable surface is thus free to move between its over-retracted position and its retracted position. Thus, in flight, once the movable surface has been subjected to a force tending to cause it to pass from its retracted position to its over-retracted position, the movable surface can return freely towards its retracted position and the nacelle is not subjected to any additional internal force.

In a conventional friction anti-extension mechanism, the position of the friction disk is not determined. Thus, the relative angular position of the smooth surface and of the pawl is not known when the nut is in its over-retracted first position, and it is possible that the pawl co-operates with the obstacle as it passes from the over-retracted first position to the retracted third position. The anti-rotation device can then block rotation of the screw and prevent the nut from reaching its retracted third position. It is therefore necessary for the position of the obstacle to be angularly synchronized with the position of the nut when it is in its retracted third position. The motor drive of the actuator is used for causing the nut to pass from its over-retracted first position to its retracted third position so as to provide the torque needed for bringing the nut into its third position, even if the anti-extension device should become active during this movement. The obstacle is then synchronized with the pawl. The pawl is then free both to slide over the smooth surface of the friction disk through an amplitude equal to the amplitude of the first angular sector while the nut is moving from its retracted third position to its over-retracted first position, and also to return to its retracted third position. The anti-extension mechanism is then inactive between the over-retracted and retracted positions, thus avoiding any blocking of the nut of the actuator between its first and third positions, which could generate undesired stresses on the nacelle.

Another advantage of the invention is that the small number of parts used makes the actuator more reliable.

The difference in amplitude between the first and second angular sectors takes account of manufacturing tolerances in all of the elements (nacelle, movable surface, etc. . . . ) involved in the linkage and also of the value of the retraction overtravel. It should be observed that the closer together the amplitudes of the first and second angular sectors, the greater may be the number of pawls and/or obstacles.

Manufacturing such an actuator is made easier when the portion constrained to rotate with the screw comprises a bushing slidably mounted on the screw. An assembly that is ready for installing can be made when the bushing includes a straight portion extending coaxially about the axis of rotation of the screw, and when the friction disk is slidably mounted on the straight portion of the bushing.

Advantageously, the anti-extension device comprises a first abutment disk provided with rollers having respective axes of rotation that extend radially, the first abutment disk being mounted free to rotate about the screw.

The braking of the anti-extension device is improved when the anti-extension device comprises a skew roller disk mounted free to rotate about the screw and provided with rollers having respective axes of rotation that extend in directions that form a non-zero angle with a radial direction passing through one of the ends of the roller, the skew roller disk extending between the friction disk and the portion constrained to rotate with the screw.

Such an actuator is simpler to manufacture when the smooth surface is situated at the periphery of the friction disk.

When the distance between the retracted position and the over-retracted position is less than half the pitch of the screw, it is preferable for the friction disk to co-operate with two pawls. The number of pawls that can be installed may be the first integer less than the ratio of the screw pitch to the distance between the over-retracted position and the retracted position.

The invention also provides a thrust reverser including an actuator of any of the above types.

Other characteristics and advantages of the invention appear on reading the following description of a particular, non-limiting embodiment of the invention.

BRIEF DESCRIPTION OF THE DRAWINGS

Reference is made to the accompanying figures, in which.

DETAILED DESCRIPTION OF THE INVENTION

Figure 1:
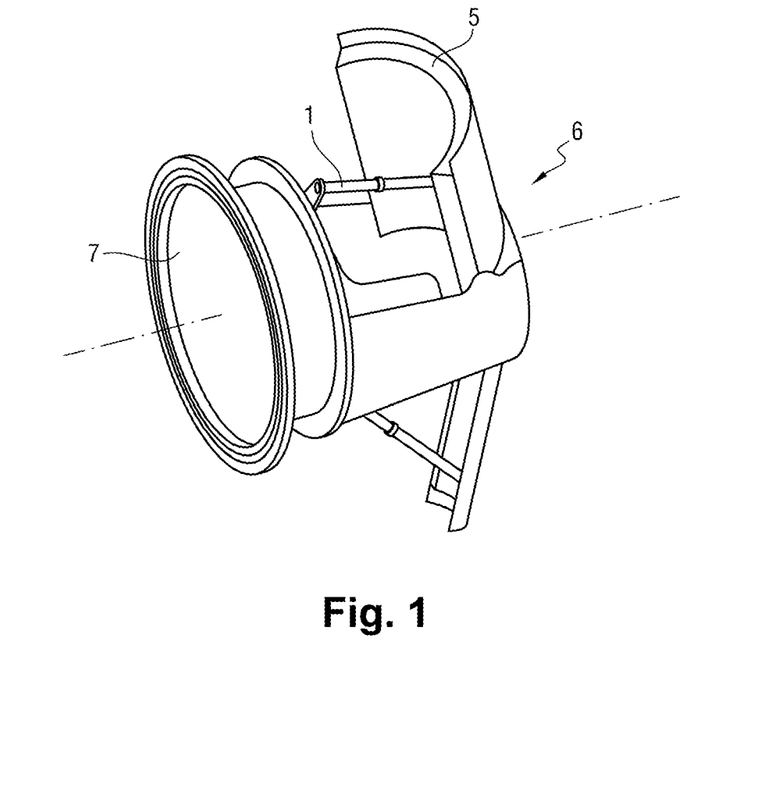
FIG. 1 is a diagrammatic perspective view of a nacelle provided with an actuator of the invention.
Figure 2:
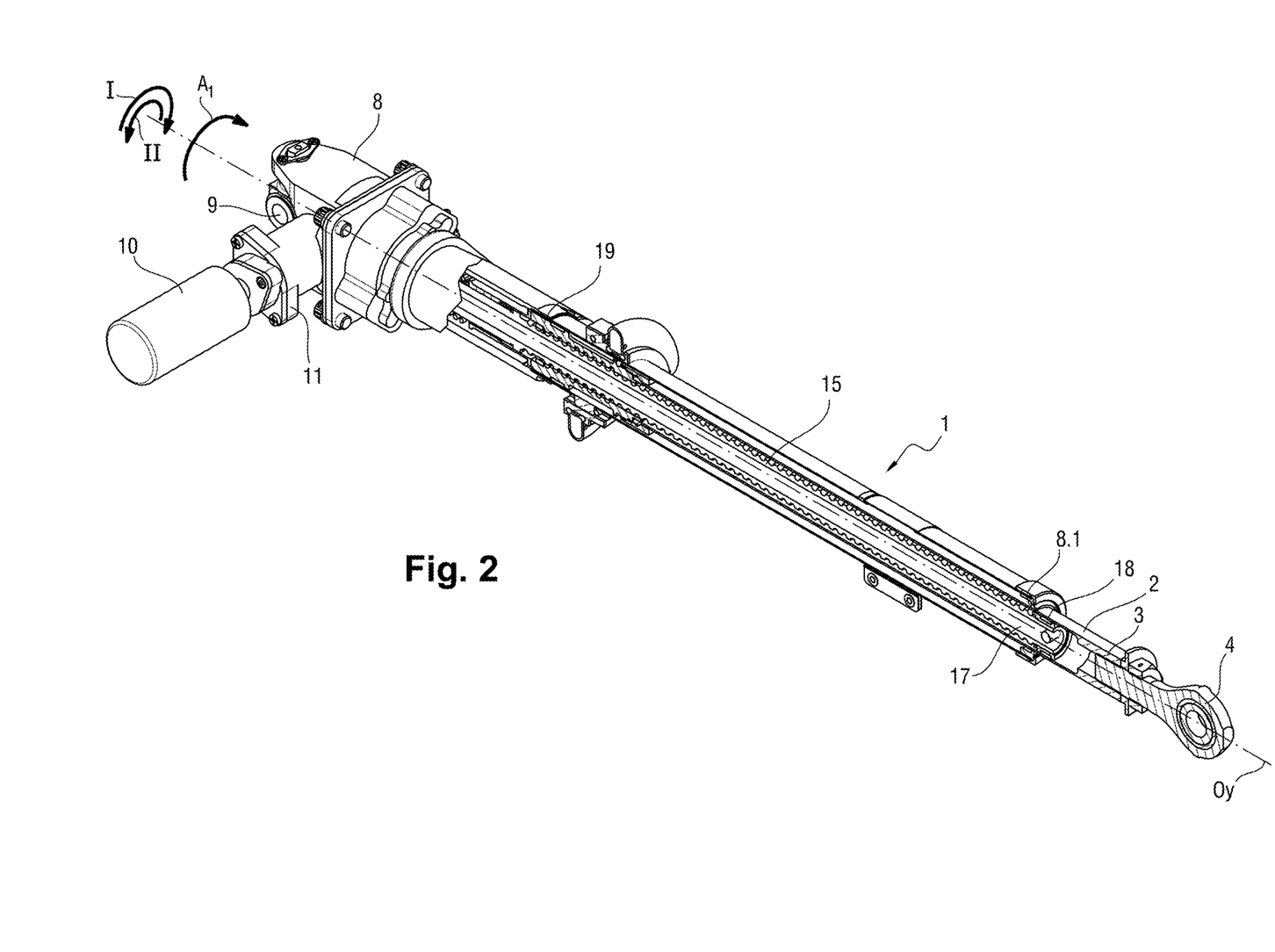
FIG. 2 is a diagrammatic perspective view of an actuator of the invention.
Figure 3:
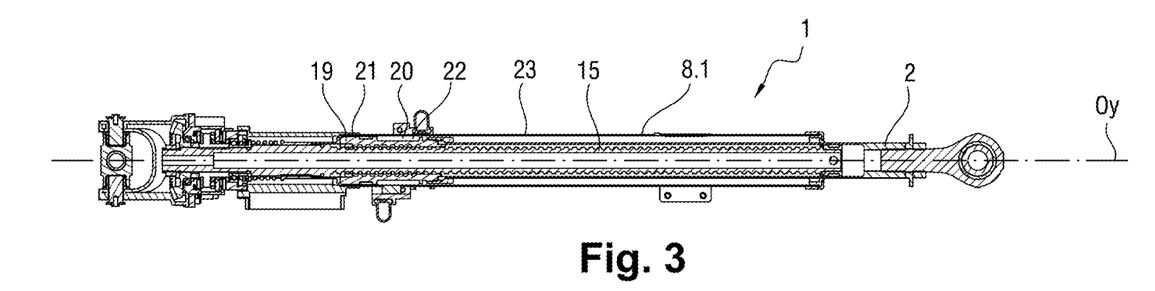
FIG. 3 is a diagrammatic section view of the actuator of the invention in the over-retracted position.
Figure 4:
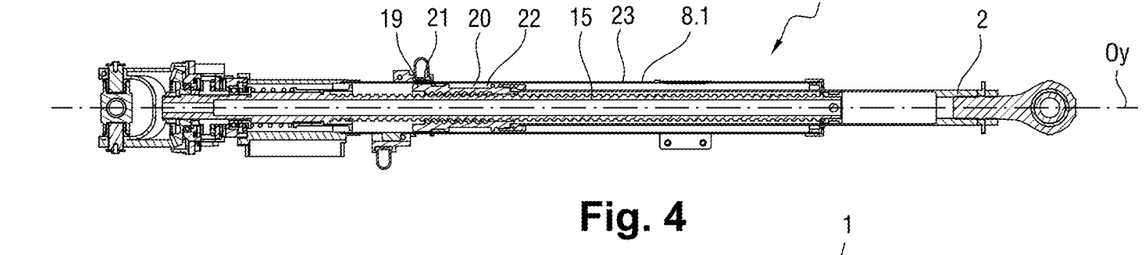
FIG. 4 is a diagrammatic section view of the actuator of the invention in the retracted position.
Figure 5:
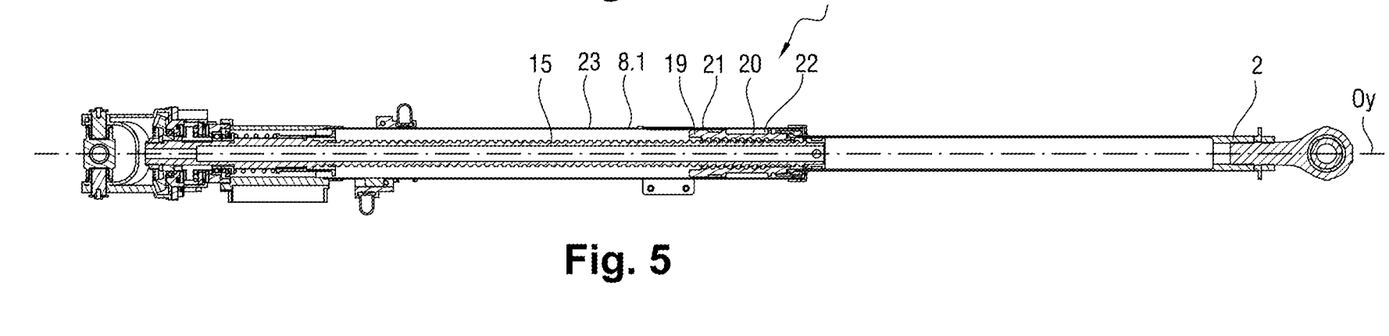
FIG. 5 is a diagrammatic section view of the actuator of the invention in the deployed position.
Figure 6:
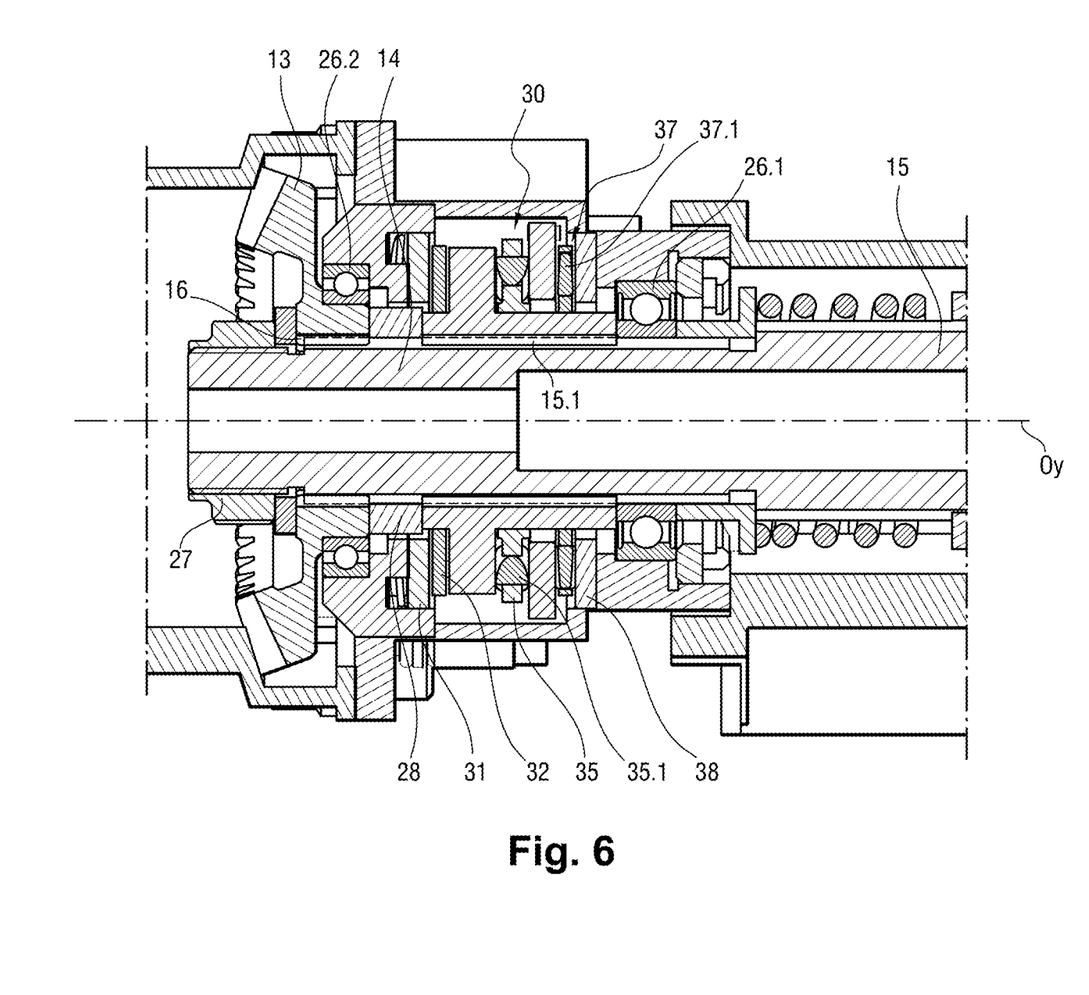
FIG. 6 is a fragmentary detail view in section of the actuator of the invention.
Figure 7:
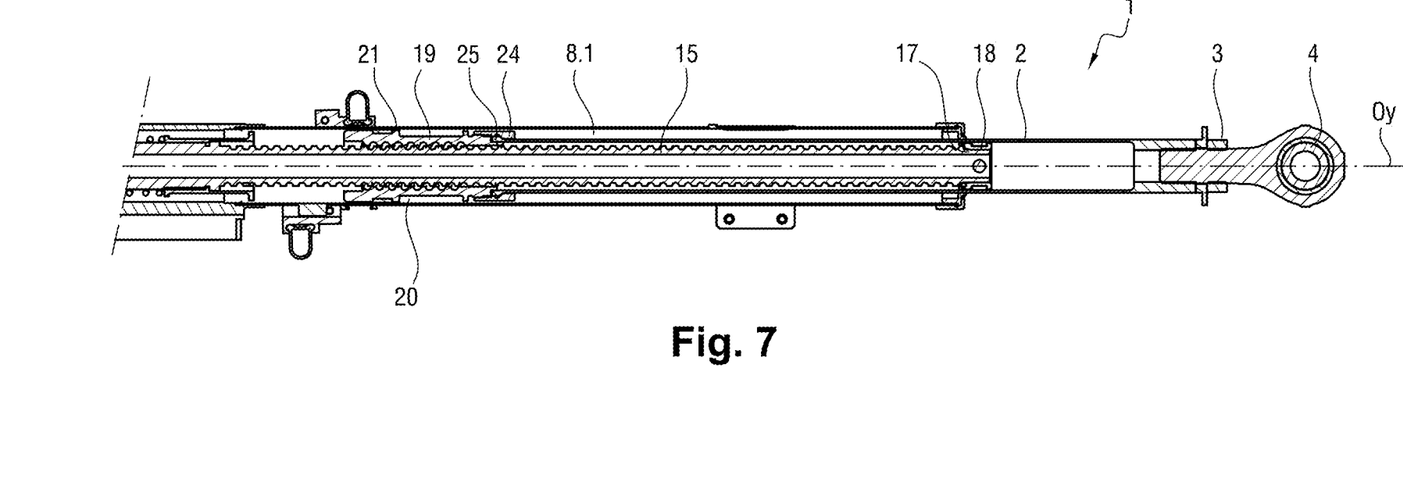
FIG. 7 is a fragmentary diagrammatic section view of the actuator of the invention.
Figure 8:
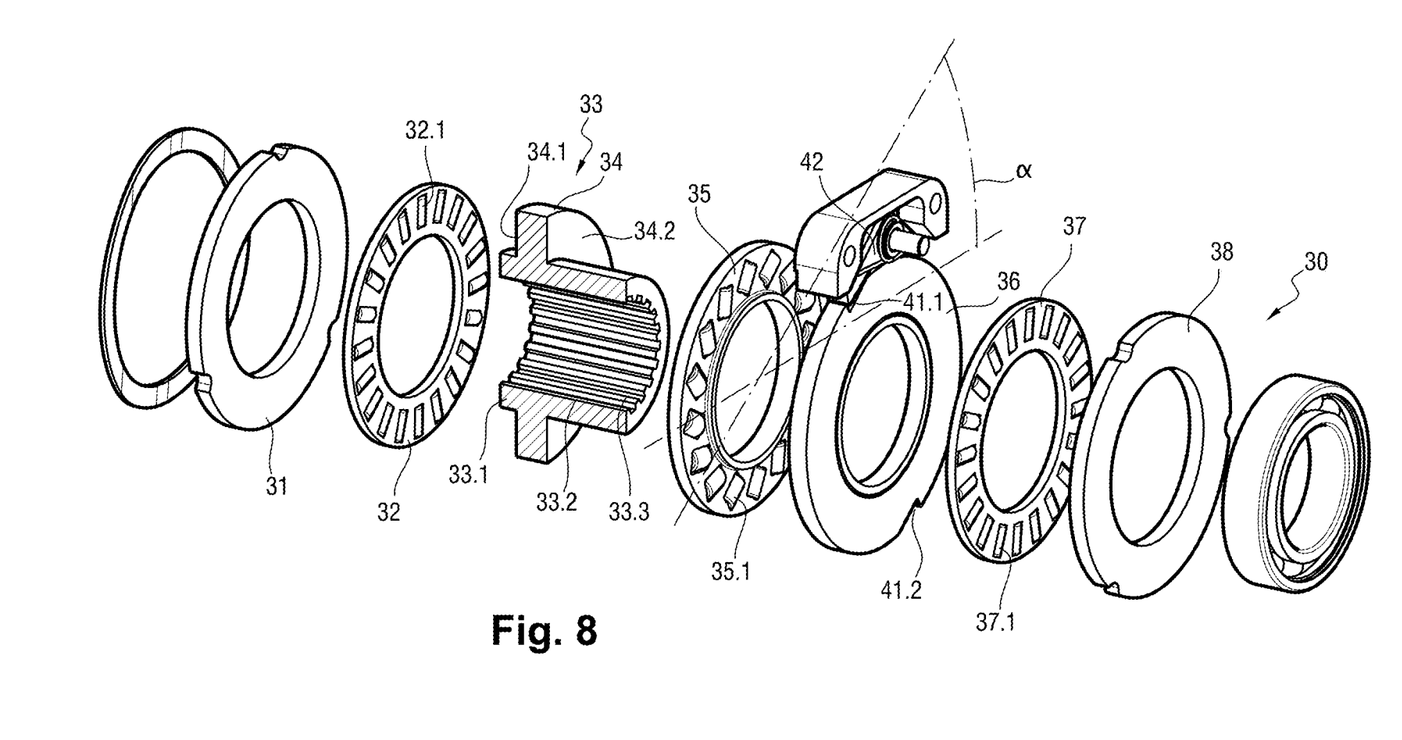
FIG. 8 is a fragmentary diagrammatic exploded view of the anti-extension device of the actuator of the invention.

With reference to FIGS. 1 to 13, the electromechanical actuator of the invention, given overall reference 1, comprises an extension tube 2 having a first end 3 with a ball clevis 4 connected to a movable surface 5 of a thrust reverser 6 of a nacelle 7. The body 8 of the actuator 1 comprises a universal joint 9 hinging the actuator 1 to the turbojet nacelle 7 and a sheath 8.1 in which the extension tube 2 slides between an over-retracted first position (shown in FIG. 3) and a deployed second position (shown in FIG. 5). FIG. 4 shows a retracted third position situated between the over-retracted first position of FIG. 3 and the deployed second position of FIG. 5. The deployed second position corresponds to a position in which the movable surface 5 is completely deployed and is then in contact with a deployment abutment. The retracted third position corresponds to a position in which the movable surface 5 is closed and in which said movable surface 5 bears against sealing gaskets extending between the movable surface 5 and the nacelle, so that its outside surface is flush with the outside surface of the nacelle. In this position, the movable surface 5 bears against the primary locking device.

The over-retracted first position corresponds to a position in which the movable surface 5 is sunk a little into its housing and flattens the sealing gaskets that extend between the movable surface 5 and the nacelle 7, the movable surface then coming into contact with an over-retracted abutment.

The actuator 1 is connected to a motor 10 via a coupling flange 11 secured to a bevel gear 12 meshing with a bevel gear 13. A fluted first end 14 of a tubular ball screw 15 is mounted in a grooved central bore 16 of the gear 13. The screw 15 extends along a longitudinal axis Oy and possesses a second end 17 provided with a ferrule 18 co-operating with the inside of the extension tube 2 in order to guide sliding along the longitudinal axis Oy. A ball nut 19 is engaged on the screw 15. A first groove 20 made in the outside face 21 of the nut 19 receives a bronze key 22 that co-operates with a second groove 23 of the sheath 8.1, thereby preventing the nut 19 from turning relative to the screw 15. The nut 19 is also connected by a threaded nut 24 connecting it to a second end 25 of the extension tube 2.

The screw 15 is rotatably mounted in bearings 26.1 and 2.2 secured to the body 8. Thus, rotation of the screw 15 in a first direction (represented by arrow I in FIG. 2) serves to move the nut 19 on the screw 15 between an over-retracted first position of the nut 19 and a deployed second position of the nut 19 that are located on either side of a retracted third position of the nut 19. The first, second, and third positions of the nut correspond respectively to the over-retracted first position of the extension tube 2 (shown in FIG. 3), to the deployed second position of the extension tube 2 (shown in FIG. 4), and to the retracted third position of the extension tube 2 (shown in FIG. 5). The distance between the over-retracted first position of the nut 19 and the retracted third position of the nut 19 corresponds to the screw 15 turning through a first angular sector $A_1$ of 160°.

The actuator 1 also has an anti-extension device 30 comprising a first bearing surface 31 secured to the body 8 and facing a first abutment disk 32 provided with rollers 32.1 having axes of rotation that extend radially (i.e. perpendicularly to the longitudinal axis Oy). The first abutment disk 32 is mounted free to rotate about a straight portion 33.1 of a bushing 33 mounted on the screw 15. The inside bore 33.2 of the busing 33 has fluting 33.3 that co-operates with grooves 15.1 of the screw 15, thereby constraining the bushing 33 to rotate with the screw 15. A nut 27 engaged on the end 14 of the screw 15 clamps the gear 13 against a spacer 28, which in turn clamps the bushing 33 against the bearing 26, thereby allowing forces to be transmitted along the longitudinal axis between the bushing 33 and the screw 15.

The bushing 33 has an annular portion 34 extending in a plane perpendicular to the longitudinal axis Oy. The annular portion 34 has a first face 34.1 extending facing the first abutment disk 32 and a second face 34.2 extending facing a skew roller disk 35. The skew roller disk 35 is mounted to rotate freely about the screw 15. More specifically, the skew roller disk 35 is mounted to rotate about the straight portion 33.1 of the bushing 33. The skew roller disk 35 is provided with rollers 35.1 having their axes of rotation extending in a direction that forms a non-zero angle □with a radial direction passing through one of the ends of each of the rollers 35.1. A friction disk 36 is mounted to rotate freely about the straight portion 33.1 of the bushing 33 and is interposed between the skew roller disk 35 and a second abutment disk 37. The second abutment disk 37 is mounted to rotate freely about the straight portion 33.1 of the bushing 33 and is provided with rollers 37.1 having axes of rotation that extend radially. A second bearing surface 38, in this example in the form of a disk, is secured to the body 8 and extends facing the second abutment disk 37.

Figure 9:
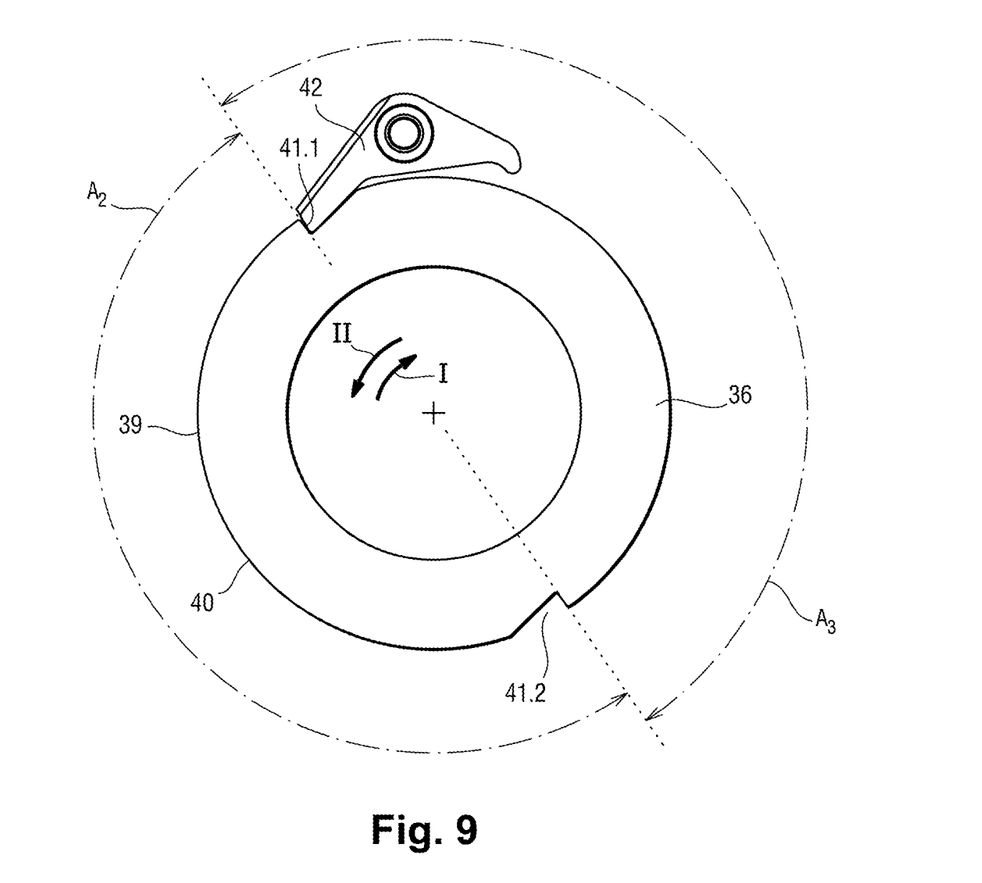
FIGS. 9 to 13 are diagrammatic views of a friction disk of the actuator of the invention in various configurations.
Figure 10:
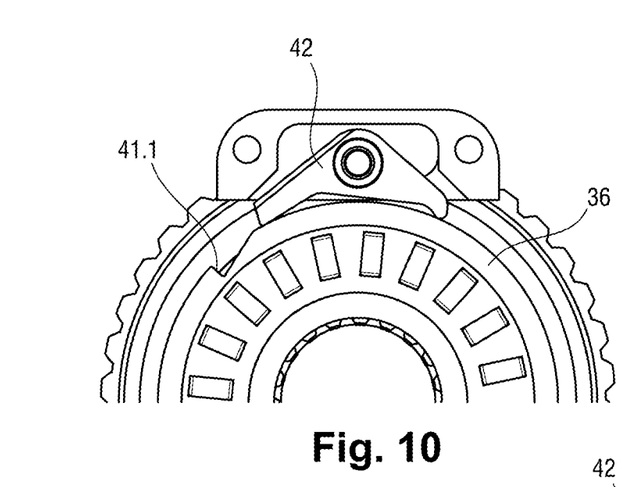
Figure 11:
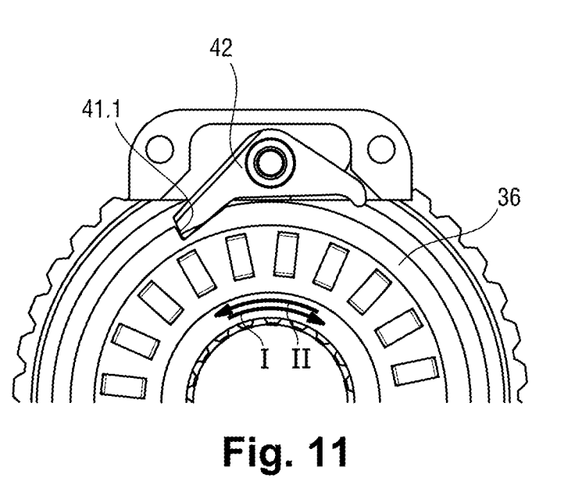
Figure 12:
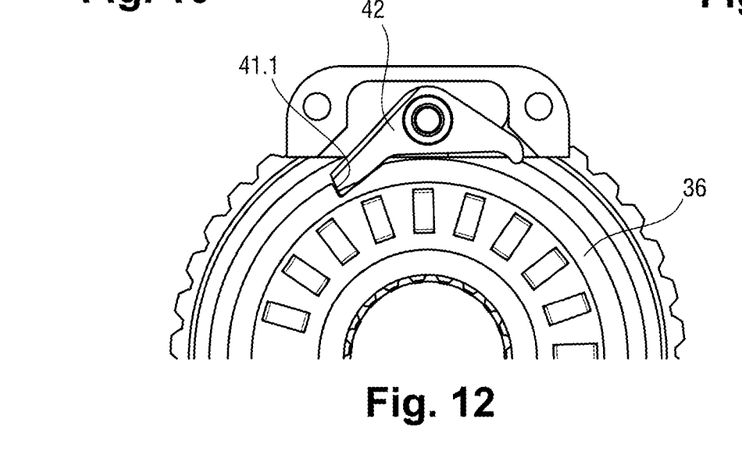
Figure 13:
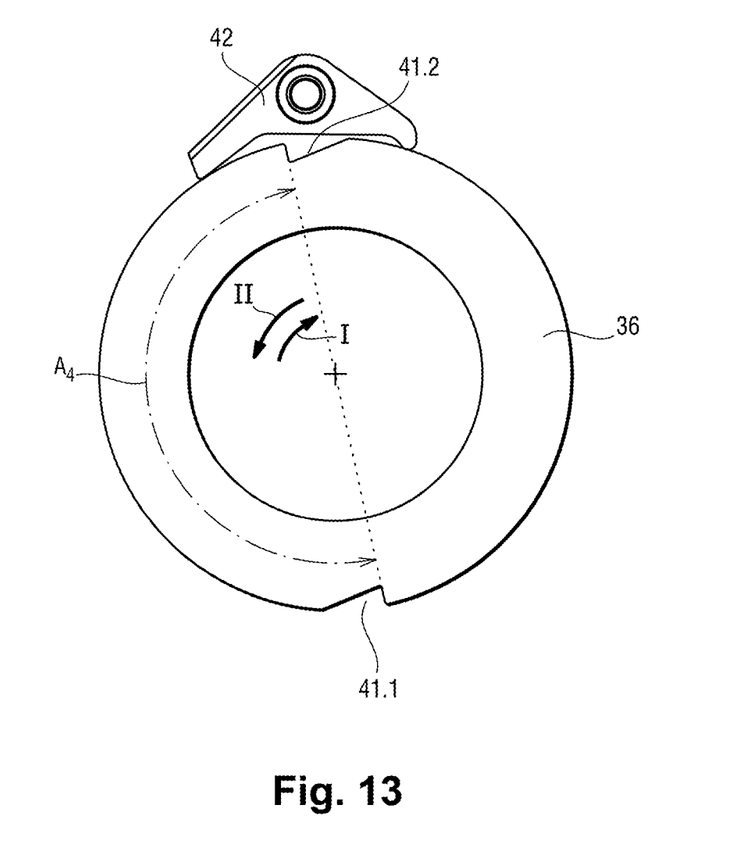

As can be seen in FIG. 9, the friction disk 36 includes, on its periphery 39, a smooth surface 40 having formed therein a first notch 41.1 and a second notch 41.2. A pawl 42 pivotally mounted on the body 8 co-operates in alternation with the smooth surface 40 (FIG. 10), with the notch 41.1 (FIG. 11), and with the notch 41.2. The smooth surface 40 and the first and second notches 41.1 and 41.2 define respectively second and third angular sectors $A_2$ and $A_3$ of 180° for free rotation of the friction disk 36 in the first direction I (and in a second direction II opposite to the first rotation I) and a position for blocking the friction disk 36 in the first direction I (FIG. 11).

The length of the smooth surface 40 is then such that the first angular sector $A_1$ of 160° is less than the second and third angular sectors $A_2$ and $A_3$, which are 180°. In operation, the nut 19 (and thus the movable surface 5) is initially in its retracted third position shown in FIG. 4 and the pawl 42 co-operates with the notch 41 (FIG. 11). In order to deploy the movable surface 5, the motor 10 is operated so as to impart rotation in the second direction of rotation II to the screw 15 through an amplitude equal to the first angular sector $A_1$=160°. The pawl 42 leaves the friction disk 36 free to rotate about the screw 15 and no braking force is applied. The nut 19 is taken from its retracted third position to its over-retracted first position (shown in FIG. 3) and the pawl 42 together with the second notch 41.2 take up the relative positions shown in FIG. 13. The gaskets of the movable surface 5 are compressed to a maximum and they exert a traction force on the nut 19 that adds to the traction forces resulting from the relative wind and from the stream from the turbojet 7, and thus acting on the screw 15, thereby clamping the second face 34.2 of the annular portion 34, the skew roller disk 35, the friction disk 36, and the second abutment disk 37 against the second bearing surface 38. The locks of the main locking device are then disengaged from the movable surface 5. Once the locks are disengaged, the motor 10 is caused to impart rotation to the screw 15 in the first direction of rotation I. During this rotation, the friction disk 36 moves along a fourth angular sector $A_4$ (having a maximum of 160° in this example) during which the pawl 42 co-operates with the smooth surface 40. The friction disk 36 is free to move in rotation and the anti-extension device 30 is not active. No braking of the movement occurs. The first notch 41.1 can then come up to the pawl 42, which engages in the notch 41 and prevents the friction disk 36 from rotating in the first direction of rotation I. The forces exerted by the relative wind and the stream from the turbojet 7 on the movable surface 5 continue to generate a traction force on the nut 9 and the anti-extension device 30 brakes rotation of the screw 15. The motor 10 continues to rotate the screw 15 in the first direction I until the nut 19 reaches its retracted third position. At this stage, the pawl 42 is already engaged in the first notch 41.1 and the anti-extension device 30 is active. The motor 10 continues to rotate the screw 5 in the direction I, and the nut 19 is subjected to a traction force from the relative wind and the stream from the turbojet 7 to which the movable surface 5 is subjected. The anti-extension device 30 brakes this movement by friction caused by the skew roller disk 35 being compressed by the annular portion 34 of the bushing 33 onto the friction disk 36, and the second abutment disk 37 against the bearing surface 38. Thereafter, the motor 10 needs to deliver to the screw 15 only the amount of torque needed for overcoming the difference between the torque generated by the relative wind on the movable surface 5 and tending to move the screw towards its deployed second position and the braking torque applied by the anti-extension device 30 on the bushing 33.

While the nut 19 is passing from its deployed second position to its over-retracted first position, the pawl 42 leaves the friction disk 36 free to rotate in the second direction of rotation II. The nut 19 goes from its over-retracted first position to its retracted third position in a manner identical to that described above.

Naturally, the invention is not limited to the embodiments described, but covers any variant coming within the field of application of the invention as defined by the claims.

In particular:

although herein a single pawl is described, the invention applies equally to an actuator having a second pawl for co-operating with the second notch. The invention also applies to a single notch/pawl assembly or to more than two notches and/or pawls;

although herein the actuator comprises an extension tube that is provided with a ball clevis, the invention applies equally to other means for connecting to an element for moving, such as for example a connecting rod that is connected by means of an eyelet or a pivot;

although herein the actuator is connected to the motor by means of a flange, the invention applies equally to other means for coupling a motor to the actuator, such as for example a fluted bushing, an Oldham joint, a ball joint, a disk clutch; a flexible transmission shaft;

although herein the coupling flange is connected to a bevel gear, the invention applies equally to other means for connecting to the screw, such as for example a spur gear, a cogged or smooth belt;

although herein the first angular sector is equal to 89% of the second and third angular sectors, the invention applies equally to other minimum ratios between the first and second angular sectors;

although herein the anti-extension device has first and second roller disks in abutment together with a skew roller disk, the invention applies equally to other configurations of anti-extension devices, such as for example an anti-extension device not having a roller abutment disk and/or not having a skew roller disk, or having additional other disks, or indeed a plurality of friction disks;

although herein the pawl co-operates with notches, the invention applies equally to other types of obstacle, such as for example teeth projecting from the periphery of the disk;

although herein the bushing has an angular portion, the invention applies equally to other types of portion of the screw constrained to rotate, such as for example an annular portion machined directly in or fitted on the screw;

although herein the friction disk is mounted to rotate freely about the straight portion of the bushing, the invention applies equally to other ways of mounting the disk free to rotate freely about the screw, e.g. such as being mounted directly in contact with the screw, or on a bearing;

although herein the screw is a ball screw with a right-handed thread, the invention applies equally to other types of screw, such as for example a roller screw or a screw having a left-handed thread; and although herein the nut has a key that co-operates with the sheath, the invention applies equally to other anti-rotation means, e.g. such as ball bushings or anti-rotation blocking obtained by the junction between the extension tube and the nacelle.

The invention claimed is:

1. A nacelle, comprising:
    a thrust reverser having a movable surface having sealing gaskets extending between the movable surface and the nacelle, the movable surface being connected to an actuator, said actuator comprising:
        a body;
        a screw that is rotatably mounted on the body;
        a nut that is provided with connection means for connecting it to an element for moving, and that is engaged on the screw to be moved by the screw rotating between an over-retracted first position in which the sealing gaskets are flattened by the movable surface and a deployed second position on either side of a retracted third position, in said retracted third position the movable surface bears against the sealing gaskets, so that an outside surface of the movable surface is flush with an outside surface of the nacelle, said third position being spaced apart from the over-retracted first position by a distance corresponding to the screw rotating through a first angular sector; and
        an anti-extension device comprising a friction disk free to rotate relative to the screw and designed to use friction to brake a portion constrained to rotate with the screw when the element for moving exerts a traction force on the nut tending to move the nut towards the deployed second position,
    wherein the friction disk has at least one smooth surface and only two obstacles arranged in the smooth surface both for co-operating with at least one pawl connected to the body, thereby defining both at least one second angular sector of free rotation for the friction disk in a predetermined direction and also a position for blocking the friction disk in this predetermined direction, the smooth surface having a length such that the amplitude of the first angular sector is strictly less than the amplitude of the second angular sector.

2. The nacelle according to claim 1, wherein the portion constrained to rotate with the screw comprises a bushing slidably mounted on the screw.

3. The nacelle according to claim 2, wherein the bushing includes a straight portion extending coaxially about the axis of rotation of the screw, and the friction disk is slidably mounted on the straight portion of the bushing.

4. The nacelle according to claim 1, wherein the anti-extension device comprises a first abutment disk provided with rollers having respective axes of rotation that extend radially with respect to the rollers, the first abutment disk being mounted free to rotate about the screw.

5. The nacelle according to claim 4, wherein the anti-extension device comprises a second abutment disk provided with rollers having respective axes of rotation that extend radially with respect to the rollers, the second disk being mounted to rotate freely about the screw.

6. The nacelle according to claim 1, wherein the anti-extension device comprises a skew roller disk mounted free to rotate about the screw and provided with rollers having respective axes of rotation that extend in directions that form a non-zero angle (a) with a radial direction passing through one of the ends of the roller, the skew roller disk extending between the friction disk and the portion constrained to rotate with the screw.

7. The nacelle according to claim 1, wherein the smooth surface is situated at the periphery of the friction disk.

8. The nacelle according to claim 1, wherein the friction disk co-operates with two pawls.

* * * * *